Patented Apr. 1, 1924.

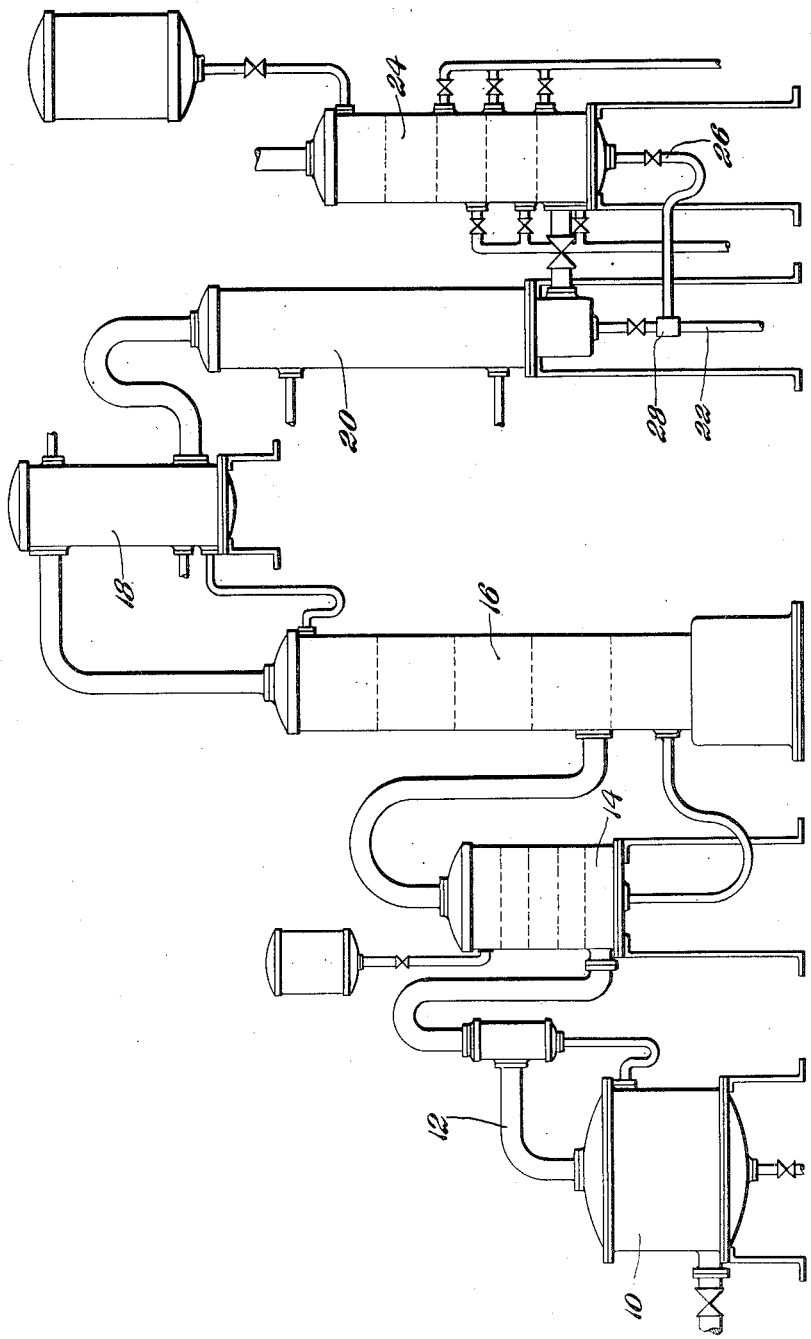

1,488,605

UNITED STATES PATENT OFFICE.

FRANK E. LICHTENTHAELER, OF NEWTON HIGHLANDS, MASSACHUSETTS.

PROCESS OF MANUFACTURING ALCOHOL-ETHER MIXTURES.

Application filed May 28, 1921. Serial No. 473,430.

*To all whom it may concern:*

Be it known that I, FRANK EDWARD LICHTENTHAELER, a citizen of the United States, residing at Newton Highlands, in the county of Middlesex and State of Massachusetts, have invented certain new and useful Improvements in Processes of Manufacturing Alcohol-Ether Mixtures; and I do hereby declare the following to be a full, clear, and exact description of the invention, such as will enable others skilled in the art to which it appertains to make and use the same.

This invention relates to a process for the manufacture of alcohol ether mixtures and more particularly to a process for the manufacture of alcohol ether mixtures adapted for use as motor fuel.

The object of the invention is to provide a novel and improved process by which alcohol ether mixtures may be advantageously manufactured.

In the manufacture of alcohol ether mixtures the storage and handling of ether as such has heretofore presented serious difficulty. Because of the high volatility of ether and its incident fire risk, refrigerating systems are at the present time employed in practically all instances where ether is handled or stored in appreciable quantities. The losses from vaporization in both storage and handling have been such as to necessitate the installation of such refrigerating system, and in the manufacture of motor fuel fire risk has been an important factor in hindering the industrial undertaking of this manufacture. The use of alcohol ether mixtures containing varying percentages of ether up to approximately 45 per cent has been found to be suitable for general use as motor fuel. Alcohol alone has been found unsuitable for such use because of its low volatility and consequent difficulty of vaporization. Furthermore, in certain sections the climatic conditions are such that during a major portion of the year available condensing water is relatively warm, a fact which has heretofore seriously interfered with the successful and economical production of alcohol ether mixtures, and particularly with the production of alcohol ether motor fuel.

At the present time the general method employed for the production of alcohol-ether mixtures comprises the generation of ether through the reaction of sulphuric acid upon alcohol, the fractionation of the vapors and recovery of the ether in a more or less concentrated form by condensation. Ether, however, has a very low boiling point, in the neighborhood of 95° F., and a correspondingly high vapor pressure. In these warm sections the temperature of available condensing water too closely approaches the boiling point of the ether, so that it will be apparent that the practical condensation of ether vapor by means of such warm water is a matter of considerable difficulty. The result has been that the large losses of ether during the manufacture of alcohol ether mixtures and the fire risk incident to handling liquid ether as such as well as the difficulties in condensing the ether, have necessitated the installation and employment of expensive refrigerating apparatus for the proper condensation of the ether vapor and the cooling of the condensate.

The present invention therefore contemplates a process for the manufacture of alcohol ether mixtures in which all of the difficulties heretofore encountered in the condensation of the ether and its storage are eliminated, and in which the risks and difficulties incident to the handling of liquid ether as such are eliminated. By the present process alcohol ether mixtures of the proportions requisite for motor fuel may be economically manufactured in all climates.

In the drawing apparatus is diagrammatically illustrated for the production of alcohol ether mixtures according to the present process.

Referring to the drawing, ether vapor is generated within a generator 10 by the reaction of sulphuric acid upon ethyl alcohol according to the present known procedure. The ether vapors together with considerable undecomposed alcohol and water produced by the reaction leave the generator through the pipe 12. The ether vapors are neutralized and concentrated by passage through a scrubber 14 containing alkali, a fractionating column 16 and a condenser 18 for removing the last portions of water from the vapors, all of well-known construction and such as are now commonly employed in the manufacture of ether. From the condenser 18 the concentrated ether vapors are led through an elongated condenser 20 of any usual or preferred construction, by which a maximum amount of ether is condensed through the medium of the available condensing water even though as warm as 80° to 85° F. The condensed ether leaves the condenser through the down pipe 22 and the uncondensed ether vapors are conducted to an absorbing tower 24 within which a stream of alcohol is flowed in a direction counter-current to the course of the uncondensed ether vapors. The absorbing tower 24 may be of any desired construction to present a large area of contact between the descending alcohol and rising ether vapors. As the ether vapors rise through the absorbing tower 24 and are brought into contact with the alcohol, they are absorbed directly in the alcohol forming a more or less dilute mixture of alcohol and ether. The alcohol ether mixture within the absorbing tower is preferably water cooled and is conducted from the tower through the down pipe 26 to the down pipe 22 from the condenser 20 where it unites with the substantially pure ether coming from the condenser 20 to form an alcohol ether mixture suitable for motor fuel or other purposes.

It will therefore be observed that according to the present process alcohol ether mixtures may be manufactured without the expense of refrigerating apparatus heretofore employed. The handling and storage of liquid ether, as such, are eliminated, and a product obtained having no more fire risk than gasoline. With condensing water of a temperature of as high as 80° to 85° F., a sufficient proportion of the ether may be condensed within the condenser 20 to enable the remaining portion to be absorbed in the higher boiling alcohol without raising the temperature thereof beyond practical limits, and without the necessity of employing such an excess of alcohol as to detract from the strength and quality of the final product, such as an alcohol ether mixture capable of being successfully used as a motor fuel. In this manner by the combination of the step of partially condensing the ether and subsequently absorbing the uncondensed portion directly in alcohol, an alcohol ether mixture of the requisite proportions may be economically produced.

In carrying out the process, the ether generator 10 is preferably operated so that the vapors emerging therefrom contain a maximum quantity of ether and a minimum quantity of alcohol, thus enabling ether of high concentration to be obtained from the condenser 20. This procedure is conducive to the economy of the process, for the reason that the excess of heat which would otherwise be necessary to vaporize a large quantity of alcohol along with the ether is avoided. Furthermore, if desired the operations of condensing and absorbing the ether vapors may be carried out in an absorber without the preliminary condenser, all the ether vapors being brought in direct contact with the alcohol, and the latter kept cool by indirect cooling.

Having thus described the invention what is claimed is:—

1. The process of manufacturing an alcohol ether motor fuel under conditions in which available condensing water is relatively warm, which consists in treating alcohol to generate a maximum proportion of ether vapor and a minimum proportion of alcohol vapor, partially condensing the ether vapor by means of the relatively warm condensing water, condensing the uncondensed ether vapor in alcohol to form a relatively dilute alcohol ether mixture, and thereafter mixing the condensed ether and the relatively dilute alcohol ether mixture to form a more concentrated alcohol ether mixture suitable for motor fuel.

2. The process of manufacturing alcohol ether motor fuel under relatively warm climatic conditions without the necessity for handling and storing the liquid ether as such, which consists in generating ether vapor from alcohol, continuously condensing such portion of the ether vapor thus generated as the available warm condenser water permits, continuously absorbing the remaining uncondensed portion of the ether vapor directly in alcohol, and continuously mixing the condensed ether with the alcohol ether mixture thus formed to form an alcohol ether motor fuel.

3. The method of manufacturing alcohol into motor fuel under relatively warm climatic conditions and without the necessity of handling and storing liquid ether as such, which consists in generating ether vapor from alcohol and absorbing the ether vapor thus generated directly in a sufficient volume of alcohol to produce an alcohol ether mixture of such concentration of ether as to render it capable of use as a motor fuel.

4. The method herein described of manufacturing alcohol into ether-alcohol motor fuel without the necessity of handling and storing liquid ether as such, consisting in continuously generating ether vapor from alcohol, continuously condensing the greater portion of the ether vapor thus generated and permitting the vapor not condensed to pass beyond the condenser, continuously mixing with the condensed ether vapor a stream of additional alcohol to thereby obtain the desired percentages in the final product, and carrying the uncondensed ether vapors from the condenser into said continuous stream of additional alcohol counter-currentwise so as to thereby absorb said uncondensed vapor in said additional alcohol, whereby the additional supply of alcohol is utilized to catch and condense the ether vapor that passes over from the condenser, thereby rendering it unnecessary to employ low temperatures in the condenser.

5. The method herein described of manufacturing alcohol into ether-alcohol motor ful without the necessity of handling and storing liquid ether as such, consisting in continuously generating ether and alcohol vapors from alcohol, continuously condensing the greater portion of the ether vapor thus generated and permitting the vapor not condensed to pass beyond the condenser, continuously mixing with the condensed ether and alcohol vapors a stream of additional alcohol to thereby obtain the desired percentages in the final product, and carrying the uncondensed ether and alcohol vapors from the condenser into said continuous stream of additional alcohol counter-currentwise so as to thereby absorb said uncondensed vapors in said additional alcohol, whereby the additional supply of alcohol is utilized to catch and condense the ether vapor that passes over from the condenser, thereby rendering it unnecessary to employ low temperatures in the condenser.

FRANK E. LICHTENTHAELER.